United States Patent
Wang et al.

(10) Patent No.: US 12,353,365 B1
(45) Date of Patent: Jul. 8, 2025

(54) METHOD, APPARATUS, ELECTRONIC DEVICE, AND MEDIUM FOR PROCESSING DATABASE QUERY

(71) Applicants: DOUYIN VISION CO., LTD., Beijing (CN); EAST CHINA NORMAL UNIVERSITY, Shanghai (CN)

(72) Inventors: Haoyu Wang, Beijing (CN); Yuxing Han, Beijing (CN); Chengcheng Yang, Shanghai (CN)

(73) Assignees: DOUYIN VISION CO., LTD., Beijing (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 19/007,779

(22) Filed: Jan. 2, 2025

(30) Foreign Application Priority Data

Jan. 5, 2024 (CN) .......................... 202410024423.0

(51) Int. Cl.
*G06F 16/21* (2019.01)
*G06F 9/445* (2018.01)
*G06N 20/00* (2019.01)

(52) U.S. Cl.
CPC .............. *G06F 16/21* (2019.01); *G06F 9/445* (2013.01); *G06N 20/00* (2019.01)

(58) Field of Classification Search
CPC .... G06F 16/24545; G06F 16/21; G06F 9/445; G06N 20/00
See application file for complete search history.

(56) References Cited

U.S. PATENT DOCUMENTS

2021/0365805 A1* 11/2021 Karnagel ................ G06N 5/04

OTHER PUBLICATIONS

CN117874099A Method and device for processing database query, electronic equipment and medium (Year: 2024).*

* cited by examiner

*Primary Examiner* — Hau H Hoang
(74) *Attorney, Agent, or Firm* — Alleman Hall & Tuttle LLP (57) ABSTRACT

Embodiments of the present disclosure provide a method and apparatus for estimating a number of distinct values in a database system, a device, and a medium. The method includes: reading and loading, from a distributed file system, a model for NDV estimation into a kernel of the database system; generating feature data of sample data of a target column in the database system; determining, using the model that has been loaded into the kernel, an estimated NDV for the target column based on the feature data; and storing the estimated NDV of the target column for use by the kernel of the database system.

20 Claims, 7 Drawing Sheets

FIG.1

| | Column#1 | Column#2 | Column#3 | Column#4 | Column#5 | Column#6 | Column#7 | Column#8 |
|---|---|---|---|---|---|---|---|---|
| | 1 | 0101 | 1 | 77 | 77 | 95 | 75 | 97 |
| | 1 | 0126 | 2 | 87 | 87 | 100 | 75 | 97 |
| | 1 | 0114 | 3 | 77 | 60 | 95 | 75 | 93 |
| | | 0139 | 4 | 87 | 91 | 95 | 75 | 63 |
| NDV value | 1 | 4 | 4 | 2 | 4 | 2 | 1 | 3 |

METHOD, APPARATUS, ELECTRONIC DEVICE, AND MEDIUM FOR PROCESSING DATABASE QUERY

CROSS-REFERENCE TO RELATED APPLICATION(S)

This application claims priority to Chinese Application No. 202410024423.0 filed in Jan. 5, 2024, the disclosure of which is incorporated herein by reference in its entirety.

FIELD

The present disclosure relates to the field of computers, and in particular, to a method, an apparatus, a device, and a medium for estimating a number of distinct values (NDV) in a database system.

BACKGROUND

An NDV (Number of Distinct Values) represents a number of distinct values of a column in a database table. In a large-scale database system, it is important to estimate an NDV value of the column. For example, in database query optimization, an efficient data retrieval method can be selected by estimating the NDV of the column. In data compression and storage of the database, estimating the NDV value of the column is crucial for selecting a suitable data compression method. The existing NDV estimation methods need to scan all table data, and the time cost is high on a large-scale dataset. An effective method is needed to quickly and accurately estimate the NDV.

SUMMARY

In view of the above, the present disclosure provides a method, an apparatus, a device, and a medium for estimating a number of distinct values (NDV) in a database system.

In a first aspect of the present disclosure, there is provided a method for estimating a number of distinct values (NDV) in a database system, comprising: reading and loading, from a distributed file system, a model for NDV estimation into a kernel of the database system; generating feature data of sample data of a target column in the database system; determining, using the model that has been loaded into the kernel, an estimated NDV for the target column based on the feature data; and storing the estimated NDV of the target column for use by the kernel of the database system.

In a second aspect of the present disclosure, there is provided an apparatus for estimating a number of distinct values (NDV) in a database system, comprising: a model loading unit configured to read and load, from a distributed file system, a model for NDV estimation into a kernel of the database system; a feature generation unit configured to generate feature data of sample data of a target column in the database system; an estimation unit configured to determine, using the model that has been loaded into the kernel, an estimated NDV for the target column based on the feature data; and a storage unit configured to store the estimated NDV of the target column for use by the kernel of the database system.

In a third aspect of the present disclosure, there is provided an electronic device, comprising one or more processors; and a storage apparatus configured to store one or more programs that, when executed by the one or more processors, cause the one or more processors to implement the method according to the first aspect of the present disclosure.

In a fourth aspect of the present disclosure, there is provided a computer-readable storage medium having a computer program stored thereon, wherein the program, when executed by a processor, causes the method according to the first aspect of the present disclosure to be implemented.

In a fifth aspect of the present disclosure, there is provided a computer program product comprising a computer program that, when executed by a processor, causes the method according to the first aspect of the present disclosure to be implemented.

It should be understood that the content described in this section is not intended to identify key or important features of embodiments of the present disclosure, nor is it intended to limit the scope of the present disclosure. Other features of the present disclosure will become readily understandable through the following description.

BRIEF DESCRIPTION OF THE DRAWINGS

The above and other features, advantages, and aspects of embodiments of the present disclosure will become more apparent with reference to the following detailed description in conjunction with the accompanying drawings. In the drawings, the same or similar reference numerals denote the same or similar elements, wherein.

DETAILED DESCRIPTION OF EMBODIMENTS

The following describes exemplary embodiments of the present disclosure with reference to the accompanying drawings, which include various details of the embodiments of the present disclosure to facilitate understanding, and which should be considered as merely exemplary. Therefore, those of ordinary skill in the art should recognize that various changes and modifications can be made to the embodiments described here without departing from the scope and spirit of the present disclosure. Similarly, for clarity and conciseness, descriptions of well-known functions and structures are omitted below.

In the description of the embodiments of the present disclosure, the term "include/comprise" and similar terms should be understood as an open inclusion, that is, "include/comprise but not limited to". The term "based on" should be understood as "at least partially based on". The term "an embodiment" or "the embodiment" should be understood as "at least one embodiment". The terms "first", "second", and the like may refer to different or the same objects. Other definitions, either explicit or implicit, may be included below.

As used herein, the term "model" may learn an association between a corresponding input and output from training data, so that after training is completed, a corresponding output may be generated for a given input. Generation of the model may be based on machine learning techniques. Deep learning is a machine learning algorithm that processes an input and provides a corresponding output using a plurality of processing units. A neural network model is an example of a model based on deep learning. Herein, a "model" may also be referred to as a "machine learning model", a "learning model", a "machine learning network", or a "learning network", which are used interchangeably herein.

A "neural network" is a machine learning network based on deep learning. A neural network can process an input and provide a corresponding output, and usually includes an input layer, an output layer, and one or more hidden layers between the input layer and the output layer. A neural network used in deep learning applications usually includes many hidden layers, thereby increasing the depth of the network. The layers of the neural network are connected in sequence, so that an output of a previous layer is provided as an input of a next layer, where the input layer receives an input of the neural network, and an output of the output layer is used as a final output of the neural network. Each layer of the neural network includes one or more nodes (also referred to as processing nodes or neurons), and each node processes an input from a previous layer.

Generally, machine learning may include approximately three phases, namely, a training phase, a test phase, and a use phase (also referred to as an inference phase). In the training phase, a given model may be trained using a large amount of training data, and parameter values are iteratively updated until the model can obtain consistent inference from the training data that meets an expected target. Through training, the model may be considered to be able to learn an association (also referred to as an input-to-output mapping) between an input and an output from the training data. Parameter values of the trained model are determined. In the test phase, a test input is applied to the trained model to test whether the model can provide a correct output, thereby determining the performance of the model. In some implementations, the test phase may be omitted. In the use phase, the model may be used to process an actual input based on parameter values obtained through training to determine a corresponding output.

A database system often needs to collect statistical data information, for example, a number of distinct values (NDV) to achieve system optimization. For example, in query optimization, by estimating the NDV of a column, the database system can select a suitable data retrieval method. If the NDV is not accurately estimated, the data retrieval efficiency may decline. Regarding data compression, by estimating the NDV of a column, a suitable data compression method can be selected to achieve a significant storage space saving effect.

In a large-scale data warehouse system, a traditional NDV estimation framework scans table data in a system kernel for each column in a database table, to obtain an NDV estimation result for each column. Finally, these results are stored in the form of a system table or saved as metadata information for use by other external components. These methods need to scan all table data to obtain high estimation accuracy, and the time cost is huge. In addition, in a large-scale database with frequent updates, it is necessary to continuously scan all table data, which affects the performance of the database itself.

In view of the above, embodiments of the present disclosure provide a method for estimating an NDV in a database system. The method integrates a machine learning model into the database system, and uses the model to estimate the NDV of the column of the database with different data scales, providing users with more accurate and efficient NDV estimation results. Although training an NDV estimation model is a task that consumes system resources and requires a certain amount of training time, the NDV estimation model can be applied to various workloads once the training is completed. According to embodiments of the present disclosure, an NDV estimation model is trained offline in advance outside the database system, and the trained model is stored to a distributed file system, to avoid affecting the performance of the data warehouse system. The NDV estimation model may be periodically or dynamically loaded into the kernel of the database system for performing NDV estimation on a column of the database, to avoid affecting the performance of the database system. For the NDV estimation anomaly in some specific scenarios, a model fine-tuning mechanism is also introduced, and through further training of the model, accurate and efficient estimation of the NDV value in databases with different scales can be achieved. Embodiments of the present disclosure will be described in detail below with reference to the drawings.

Figure 1:
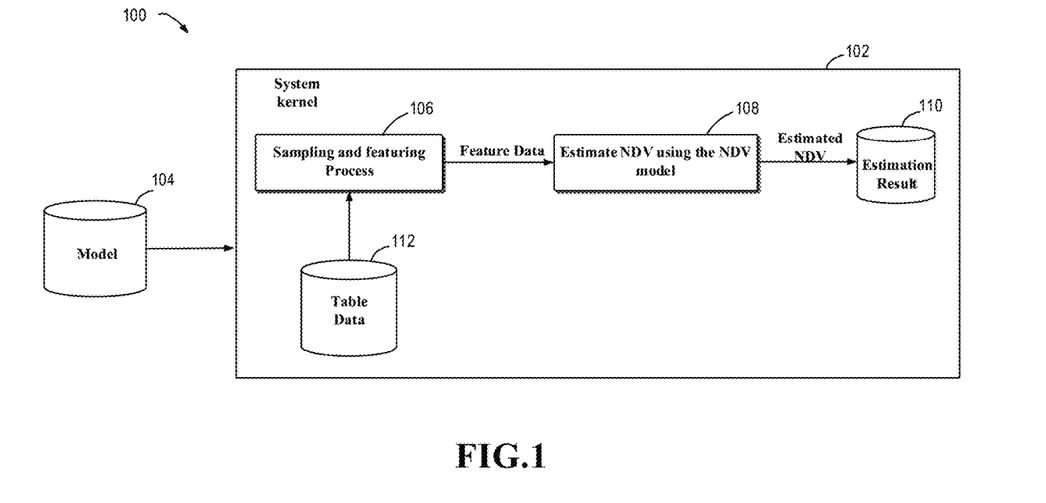
FIG. 1 illustrates a schematic diagram of a model-based NDV estimation system according to embodiments of the present disclosure.

FIG. 1 illustrates a schematic diagram of a model-based NDV estimation system 100 according to embodiments of the present disclosure. It should be understood that the system 100 shown in FIG. 1 is only exemplary, and should not constitute any limitation on the functions and scope of the embodiments described in the present disclosure. As shown in the figure, in the system 100, a database system kernel 102 includes a database table 112 that records table data, a sampling and featuring processing module 106, an NDV estimation module 108 that uses an NDV estimation model, and a memory 110 that stores an NDV estimation result.

The database system kernel 102 may read an NDV machine learning model from a distributed file system 104 and load the NDV machine learning model into the system kernel 102. The distributed file system 104 may be separated from the database system kernel 102, and may be, for example, a Hadoop distributed file system (HDFS). The NDV machine learning model may be trained in an offline manner. For example, at a training node, table data is obtained from a database system, and the ground truth NDV data obtained by scanning all table data is used as supervision data to train the model, and then the trained model is stored in the distributed file system 104. At the inference stage, the trained model may receive feature data of the data table as input, and output an estimated NDV The NDV model may be a pre-trained model, which is trained once (one-model-for-all) and is applicable to various tasks.

In response to an instruction to obtain related statistical information (for example, an aggregation query), the module 106 may sample data recorded in the database table 112. In some embodiments, the sampling and featuring processing module 106 may implement fast data sampling on the database table 112 by constructing an internal structured query language (SQL). After the sampling is completed, the sampling and featuring processing module 106 may perform featuring process on the sample data to obtain feature data.

The NDV estimation module 108 receives the feature data from the sampling and featuring processing module 106 as input. The NDV estimation module 108 calls the NDV model to perform an inference process, and outputs an estimated NDV The database system kernel 102 stores the obtained estimated NDV in the memory 110 in the system kernel 102. In some embodiments, the memory 110 may be a buffer, which is convenient for the system kernel 102 to quickly call the estimated NDV.

Figure 2:
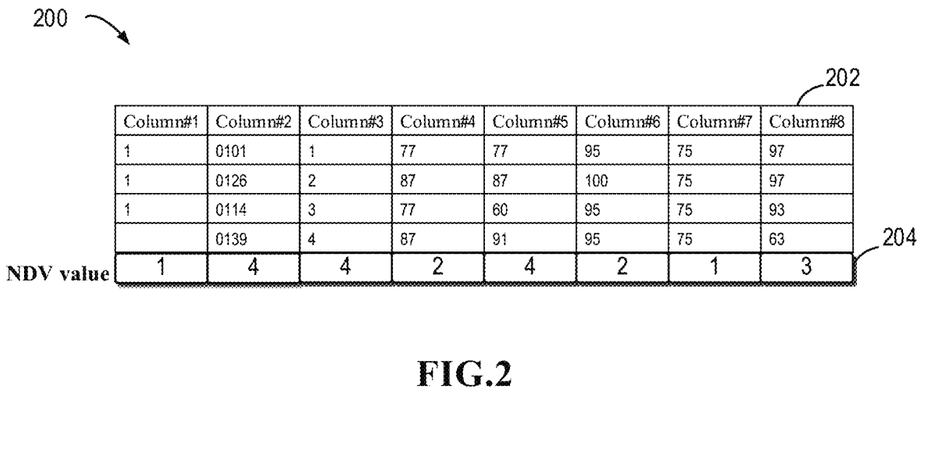
FIG. 2 illustrates a schematic diagram of calculating an actual value of an NDV of a column according to embodiments of the present disclosure.

FIG. 2 illustrates a schematic diagram of calculating an actual value of an NDV of a column according to embodiments of the present disclosure. It should be noted that the rows and columns of the database table shown in FIG. 2 and the values of the elements are only schematic, and are only used for intuitive understanding of the calculation of the NDV value. In fact, the number of rows and columns of the database table and the values of the elements may vary.

As shown in FIG. 2, the data table 202 has a total of 8 columns and 4 rows, and values in different rows and columns are not completely consistent. In the first column, the value of each row is 1 (that is, there is only one distinct value in the entire column), so the calculation result of the NDV value 204 is 1, indicating that the number of distinct values in the first column is 1. In the second column, the values of each row are not consistent, so the calculation result of the NDV value 204 is 4. Similarly, the NDV values 204 of the third column and the fifth column are also 4. In the fourth column, there are a total of 2 groups of the same values, namely 77 and 87, so the NDV value 204 is 2.

The technical solution described above is only for example, not to limit the present disclosure. In order to explain the principle of the above solution more clearly, a method for estimating an NDV in a database will be described in more detail below with reference to FIG. 3.

Figure 3:
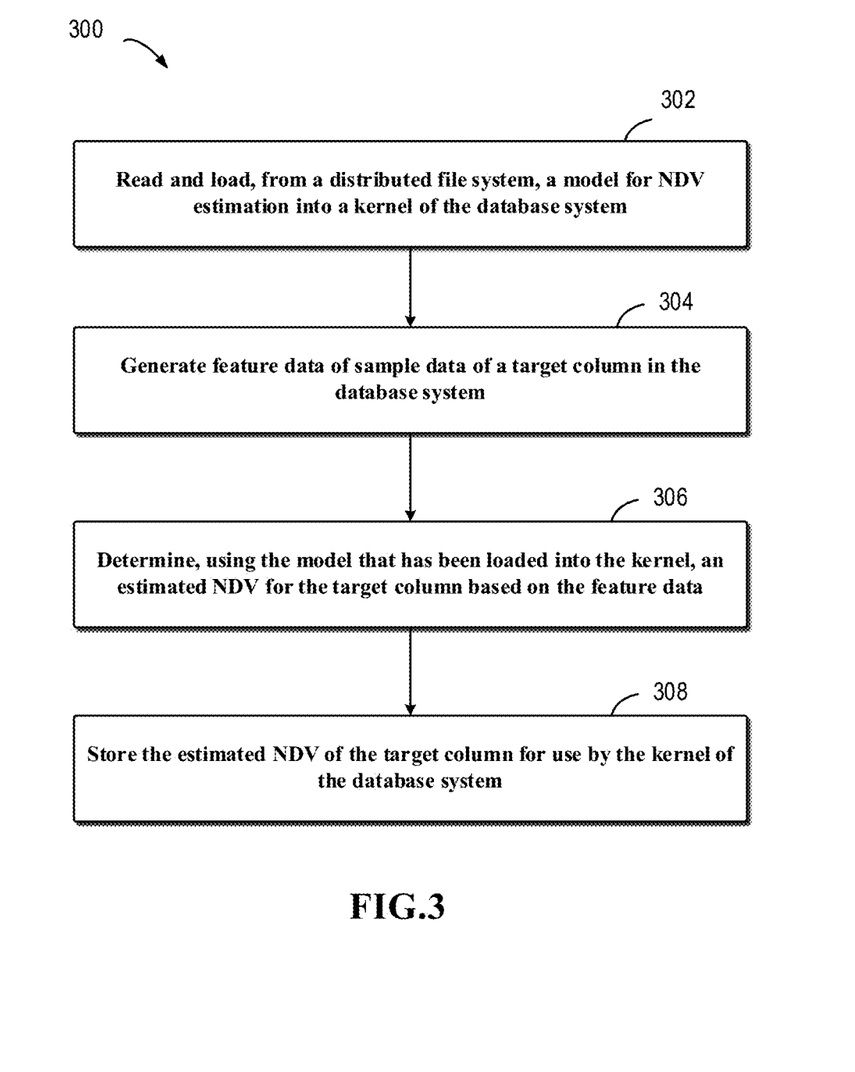
FIG. 3 illustrates a schematic flowchart of a method for estimating an NDV in a database according to embodiments of the present disclosure.

FIG. 3 illustrates a schematic flowchart of a method 300 for estimating an NDV in a database according to embodiments of the present disclosure. It should be understood that the method 300 is only schematic, and may further include additional actions not shown and/or actions shown may be omitted. The scope of the present disclosure is not limited in this respect.

At block 302, a model for NDV estimation is read and loaded from a distributed file system into a kernel of the database system. The model for NDV estimation may be a pre-trained model, which can be applied to various workloads after being trained once. In some implementations, a basic method of maximum likelihood estimation is used, and a supervision learning framework is introduced for training, so that more accurate NDV estimation results can be obtained in various databases of different scales. In addition, the model for estimating the NDV can ensure a good estimation result when the data sampling rate is low. On the other hand, the model occupies less system resources during the inference process, so that the performance of the database system is not significantly affected.

At block 304, feature data of sample data of a target column in the database system is generated. Specifically, the sample data may be obtained from the table data 112 by constructing an internal structured query language (SQL) statement in the system kernel 104 in advance. The sampling rule may be based on time information of data items or a value distribution of the target column. It can be understood that the sample data should reflect the distribution of the data of the target column as much as possible. Based on the sample data, the database system kernel 102 may perform featuring process on the sample data. As an example, the featuring process may be based on occurrence frequencies of data items: for an occurrence frequency of each data item, a number of different elements is calculated to obtain a feature vector Fi. For example, for data items with values "4", "2", "4", "6", and "6" in the target column, the number of elements that occur once is 1 (value "1"), and the number of elements and that occur twice is 2 (value "4" and value "6"), so the obtained feature vector Fi is (1, 2).

At block 306, an estimated NDV for the target column is determined based on the feature data using the model for estimating the NDV that has been loaded into the kernel of the database system. The database system kernel 102 may periodically read the model for estimating the NDV into the system kernel. After the model is loaded, the database system kernel 102 may perform featuring processing on the sample data and input the feature data into the model, and the model performs an inference process to generate the estimated NDV of the target column.

At block 308, the estimated NDV is stored for use by the kernel 102 of the database system. The estimation result generated by the model may be stored in a buffer, and then the database system kernel 102 may call the estimated NDV stored in the memory 110 at any time, instead of re-executing the inference process of the model every time.

As mentioned above, the model for estimating the NDV may be pre-trained in an offline condition. In some cases, the database system may be frequently updated, or the characteristics of the data change, resulting in a decrease in the accuracy of the model, especially an underestimated NDV, which may cause a downstream task to fail or a significant decrease in performance. Therefore, fine-tuning the model helps to improve the accuracy of NDV estimation.

According to the method 300, machine learning-based NDV estimation model can be can flexibly integrated into the kernel of the database system to provide more accurate and efficient NDV estimation without affecting system performance.

Figure 4:
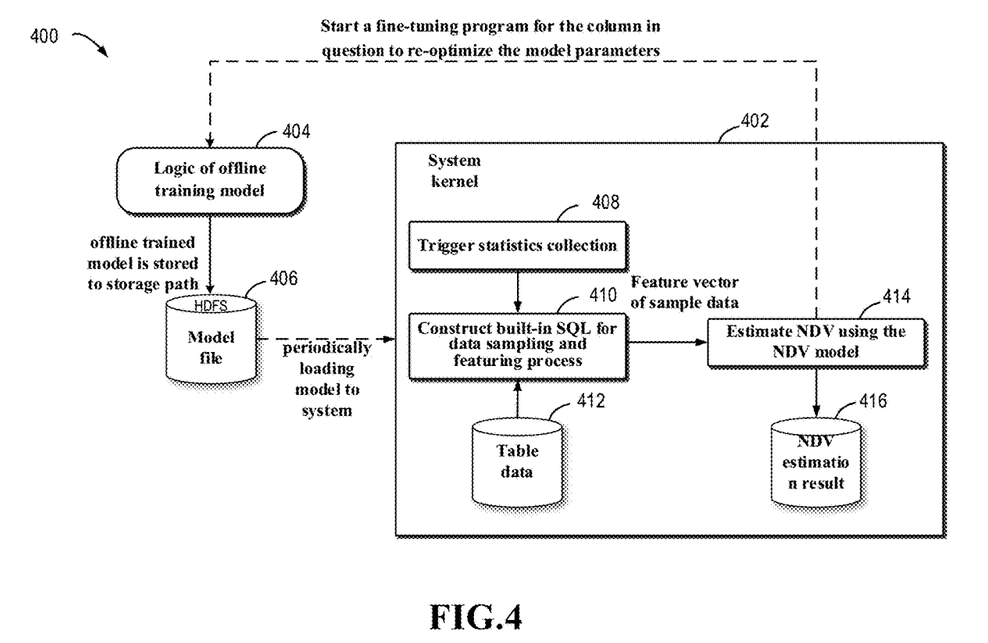
FIG. 4 illustrates a schematic block diagram of an NDV estimation system with a fine-tuning mechanism according to embodiments of the present disclosure.

FIG. 4 illustrates a schematic block diagram of an NDV estimation system with a fine-tuning mechanism according to embodiments of the present disclosure. In FIG. 4, a database system kernel 402 may be an exemplary implementation of the database system kernel 102 in FIG. 1. It should be understood that the system 400 shown in FIG. 4 is merely exemplary, and should not constitute any limitation on the functions and scope of implementation described in the present disclosure.

As shown in FIG. 4, the database system kernel 402 includes a statistics collection module 408, a sampling and featuring processing module 410, a database table 412 that records table data, an NDV estimation module 414 that uses an NDV estimation model, and a memory 416 that stores an NDV estimation result. An offline model training module 404 and a distributed file system 406 are deployed outside the database system kernel 402. In some embodiments, the distributed file system 406 may be, for example, a Hadoop distributed file system (HDFS).

As described above, the NDV estimation model 404 is trained offline outside the database system kernel 402. By training the model structure and parameters in advance outside the system kernel 402, and storing the model structure and parameters to the distributed file system 406, the database system kernel 402 can read a model file from the distributed file system 406 and load the model into the system kernel 402. In some embodiments, the database system kernel 402 may periodically read and load the model into the kernel.

In response to an instruction sent by the instruction module 408 to obtain related statistical information (for example, an aggregation query), the module 410 may sample data recorded in the database table 412. In some embodiments, the statistics collection instruction sent by the module 408 may be made by a user or automatically triggered by the system kernel 402. In some embodiments, the sampling and featuring processing module 410 may implement fast data sampling on the database table 412 by constructing an internal structured query language (SQL). After the sampling is completed, the sampling and featuring processing module 410 may perform featuring processing on the sample data to obtain feature data.

The NDV estimation module 414 receives the feature data from the sampling and featuring processing module 410 as input. The NDV estimation module 414 may call the NDV model to perform an inference process, and output and store the estimated NDV in the memory 416.

There may be an anomaly in the NDV estimated using the model for estimating the NDV (that is, there is a large difference between the estimated value and the ground truth value), for example, an underestimated situation where the estimated NDV is much smaller than the ground truth NDV value. For this possible anomaly, it is possible to periodically or randomly check whether there is an anomaly in the NDV output by the model. If there is an anomaly (or it is determined that there is underestimation), a fine-tuning program may be started for the column in question to re-optimize the model parameters.

Figure 5:
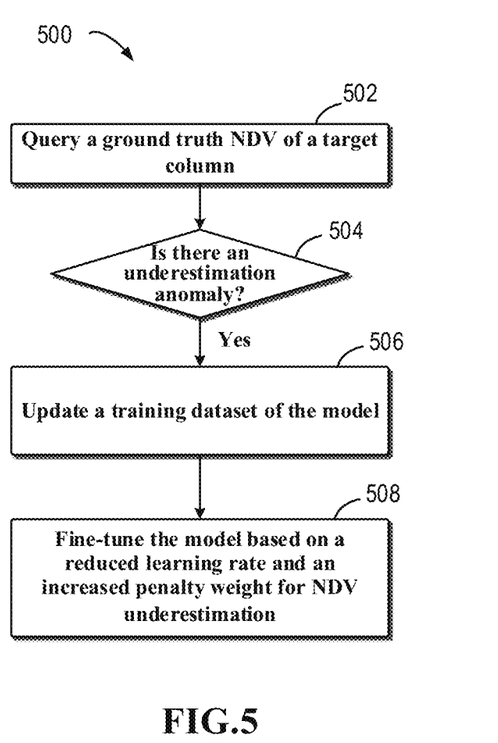
FIG. 5 illustrates a schematic flowchart of a process for fine-tuning a model according to embodiments of the present disclosure.

FIG. 5 illustrates a schematic flowchart of a process for fine-tuning a model according to embodiments of the present disclosure. At block 502, a ground truth NDV of a target column is queried. In some embodiments, the ground truth NDV may be calculated using an idle computing resource outside the database system kernel 402 to perform an SQL query.

At block 504, it is determined whether there is underestimation anomaly. If there is an underestimation anomaly, a fine-tuning program may be started for the column in question to re-optimize the model parameters. Specifically, an indicator may be calculated to determine whether there is an anomaly. It is possible to determine whether there is an anomaly based on a ratio between the estimated NDV and the ground truth NDV and a comparison between the ratio and a predetermined threshold. For example, if the estimated NDV is two orders of magnitude smaller than the ground truth NDV, it may be determined that there is an underestimation anomaly.

It can be understood that fine-tuning refers to further training performed on a trained model instead of re-training the structure and parameters of a model. The NDV estimation model may be a trained general model. From the perspective of model training, this trained general model may be referred to as a checkpoint. Since the NDV estimation model is more accurate for estimating the NDV of most target columns, the fine-tuning process may be further trained from this checkpoint, so that it will not consume too much computing resources and has a small impact on the database system.

At block 506, a training dataset of the model is updated, wherein the training dataset includes initial training data, sample data of a column related to the anomaly, and synthetic data with a high NDV feature.

At block 508, the model is fine-tuned based on the updated training data using a reduced learning rate and an increased penalty weight for NDV underestimation. Subsequently, the fine-tuned model may be stored in the distributed file system 406, waiting for the system kernel 402 to read and load the model into the kernel.

Figure 6:
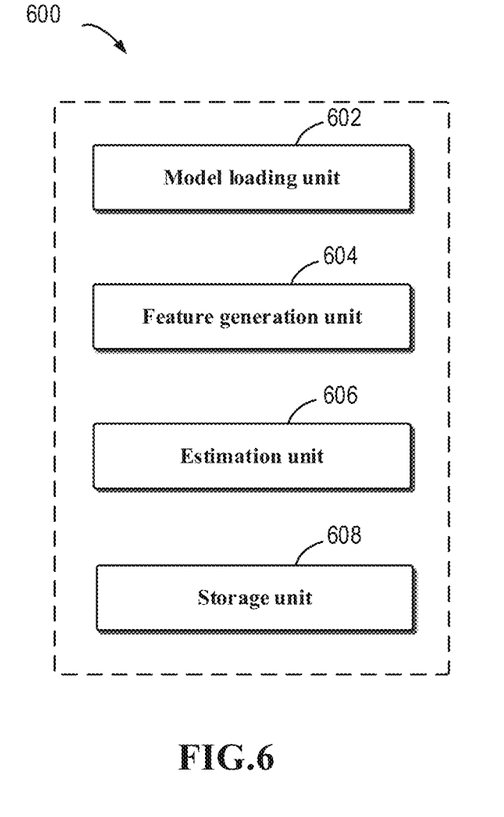
FIG. 6 illustrates a schematic block diagram of an apparatus for estimating an NDV in a database system according to embodiments of the present disclosure.

According to embodiments of the present disclosure, the present disclosure also provides an electronic device, a readable storage medium, and a computer program product. FIG. 6 shows a schematic block diagram of an apparatus 600 for estimating a number of distinct values (NDV) in a database system according to embodiments of the present disclosure. The apparatus 600 may be implemented in, for example, the database system kernel 102 shown in FIG. 1, or may be implemented in, for example, the database system kernel 402 in FIG. 4. As shown in FIG. 6, the apparatus 600 includes: a model loading unit 602, a feature generation unit 604, an estimation unit 606, and a storage unit 608.

The model loading unit 602 may be configured to read and load, from a distributed file system, a model for NDV estimation into a kernel of the database system. The feature generation unit 604 may be configured to generate feature data of sample data of a target column in the database system. The estimation unit 606 may be configured to determine, using the model that has been loaded into the kernel, an estimated NDV for the target column based on the feature data. The storage unit 608 may be configured to store the estimated NDV of the target column for use by the kernel of the database system.

In some embodiments, the NDV estimation unit may be further configured to: determine whether there is an anomaly in the estimated NDV; and in response to determining that there is an anomaly in the estimated NDV, fine-tune the model.

In some embodiments, the apparatus 600 may further include an NDV estimation anomaly determination unit, and the NDV estimation anomaly determination unit may be configured to: query a ground truth NDV of a target column when the database system is idle; and determine that there is an anomaly in the estimated NDV based on a comparison between the estimated NDV and the ground truth NDV.

In some embodiments, the anomaly may include the estimated NDV underestimating a ground truth NDV.

In some embodiments, the apparatus further includes a model fine-tuning unit, and the model fine-tuning unit may be configured to: update a training dataset of the model, wherein an updated training dataset includes initial training data, sample data of a column related to the anomaly, and synthetic data with a high NDV feature; and further train the model based on the updated training dataset.

In some embodiments, the apparatus may further include a model training unit. The model training unit may be configured to: adjust a weight of the model based on a reduced learning rate and an increased penalty weight for NDV underestimation.

In some embodiments, the model for NDV estimation is trained offline and stored in the distributed file system.

In some embodiments, the model loading unit 602 may be further configured to: periodically and asynchronously load the model into the kernel of the database using a background process independent of the database system.

In some embodiments, the feature generation unit 604 may be further configured to: generate a feature vector based on occurrence frequencies of different data elements in the sample data, wherein components of the feature vector represent the occurrence frequencies.

In some embodiments, the apparatus 600 may further include an NDV estimation trigger execution unit. The NDV estimation trigger execution unit may be configured to: in response to a user or the kernel automatically triggering statistics collection for the database system, generate the feature data.

It should be noted that more actions or steps shown in FIG. 1 to FIG. 5 may be implemented by the apparatus 600 shown in FIG. 6. For example, the apparatus 600 may include more modules or units to implement the actions or steps described above, or some units or modules shown in FIG. 6 may be further configured to implement the actions or steps described above. The description will not be repeated here.

The exemplary embodiments of the present disclosure are described above with reference to FIG. 1 to FIG. 6. Compared with the existing solutions, the solution of the present disclosure loads the NDV estimation model into the kernel of the database system and uses the model to estimate the NDV, which can quickly, accurately and efficiently estimate the NDV of the database column. Different from the prior art that requires full table scanning, this solution eliminates this time-consuming step. Meanwhile, in a frequently updated database, this solution can also achieve the beneficial effect of accurate estimation. In addition, the embodiments of the present disclosure also provide a model fine-tuning mechanism. For the situation where the NDV of the underestimated column is underestimated, the model fine-tuning is used to correct the situation, thereby achieving accurate estimation of the NDV of the database with different data scales.

Figure 7:
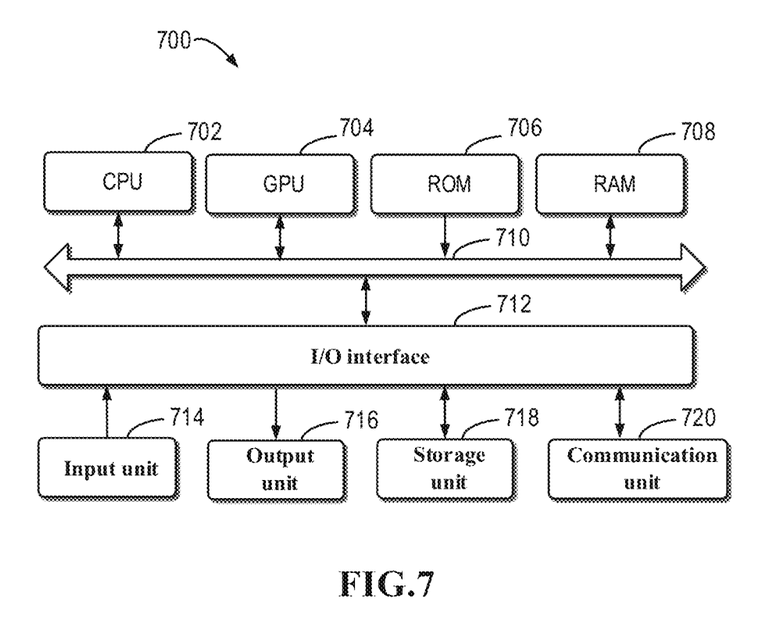
FIG. 7 illustrates a block diagram of an electronic device according to embodiments of the present disclosure.

FIG. 7 shows a block diagram of an electronic device 700 according to some embodiments of the present disclosure. The device 700 may be the device or apparatus described in the embodiments of the present disclosure. As shown in FIG. 7, the device 700 includes a central processing unit (CPU) 702 and a graphics processing unit (GPU) 704, which can perform various appropriate actions and processing in accordance with a computer program instruction stored in a read-only memory (ROM) 706 or a computer program instruction loaded from a storage unit 718 into a random access memory (RAM) 708. The RAM 708 can also store various programs and data required for the operation of the device 700. The CPU 702, the GPU 704, the ROM 706, and the RAM 708 are connected to each other through a bus 710. An input/output (I/O) interface 712 is also connected to the bus 710. Although not shown in FIG. 7, the device 700 may further include a coprocessor.

A plurality of components of the device 700 are connected to the I/O interface 712, including: an input unit 714, such as a keyboard, a mouse, etc.; an output unit 716, such as various types of displays, speakers, etc.; the storage unit 718, such as a disk, an optical disk, etc.; and a communication unit 720, such as a network card, a modem, a wireless communication transceiver, etc. The communication unit 720 allows the device 700 to exchange information/data with other devices via a computer network such as the Internet and/or various telecommunication networks.

The various methods or processes described above can be executed by the CPU 702 and the GPU 704. For example, in some embodiments, the method can be implemented as a computer software program, which is tangibly contained in a machine-readable medium, such as the storage unit 718. In some embodiments, part or all of the computer program may be loaded and/or installed onto the device 700 via the ROM 706 and/or the communication unit 720. When the computer program is loaded and executed by the CPU 702 and the GPU 704, one or more steps or actions in the method or process described above can be executed.

The various implementations of the systems and technologies described herein above can be implemented in digital electronic circuit systems, integrated circuit systems, field programmable gate arrays (FPGAs), application specific integrated circuits (ASICs), application specific standard products (ASSPs), system-on-chip systems (SOCs), load programmable logic devices (CPLDs), computer hardware, firmware, software, and/or their combination. These various implementations may include: being implemented in one or more computer programs, the one or more computer programs can be executed and/or interpreted on a programmable system including at least one programmable processor, where the programmable processor may be a special purpose or general-purpose programmable processor, and can receive data and instructions from a storage system, at least one input apparatus, and at least one output apparatus, and transmit the data and instructions to the storage system, the at least one input apparatus, and the at least one output apparatus.

The program code for implementing the method of the present disclosure may be written in any combination of one or more programming languages. The program code may be provided to a processor or controller of a general-purpose computer, special-purpose computer, or other programmable data processing apparatus such that when the program code is executed by the processor or controller, the functions/operations specified in the flowcharts and/or block diagrams are implemented. The program code may be executed entirely on a machine, partly on a machine, executed as a stand-alone software package partly on a machine and partly on a remote machine, or entirely on a remote machine or server.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include but is not limited to electronic, magnetic, optical, electromagnetic, infrared, or semiconductor systems, apparatus, or devices, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

To provide interaction with a user, the systems and techniques described herein can be implemented on a computer having: a display apparatus (for example, a CRT (cathode ray tube) or LCD (liquid crystal display) monitor) for displaying information to the user; and a keyboard and a pointing apparatus (for example, a mouse or a trackball) through which the user can provide input to the computer. Other kinds of devices may also be used to provide interaction with the user; for example, feedback provided to the user may be any form of sensory feedback (for example, visual feedback, auditory feedback, or tactile feedback); and input from the user may be received in any form, including acoustic input, voice input, or tactile input.

The systems and techniques described herein can be implemented in a computing system that includes a back-end component (for example, as a data server), or a computing system that includes a middleware component (for example, an application server), or a computing system that includes a front-end component (for example, a user computer with a graphical user interface or a web browser through which the user can interact with an implementation of the systems and technologies described herein), or a computing system that includes any combination of such back-end, middleware, or front-end components. The components of the system can be connected to each other by any form or medium of digital data communication (for example, a communication network). Examples of communication networks include: a local area network (LAN), a wide area network (WAN), and the Internet.

The computer system may include clients and servers. The clients and servers are generally far away from each other and usually interact through a communication network. The relationship between the client and the server is generated by computer programs running on corresponding computers and having a client-server relationship with each other.

It should be understood that various forms of processes shown above may be used to reorder, add, or delete steps. For example, the various steps described in the present disclosure may be executed in parallel or sequentially or in a different order, as long as the desired results of the technical solutions disclosed in the present disclosure can be achieved, which is not limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, and improvement made within the spirit and principle of the present disclosure shall be included in the protection scope of the present disclosure.

We claim:

1. A method for estimating a number of distinct values (NDV) in a database system, comprising:
   reading and loading, from a distributed file system, a model for NDV estimation into a kernel of the database system;
   generating feature data of sample data of a target column in the database system;
   determining, using the model for NDV estimation that has been loaded into the kernel of the database system, an estimated NDV for the target column in the database system based on the feature data;
   storing the estimated NDV of the target column in the database system for use by the kernel of the database system.

2. The method according to claim 1, wherein determining the estimated NDV for the target column in the database system comprises:
   determining whether there is an anomaly in the estimated NDV of the target column in the database system; and
   in response to determining that there is an anomaly in the estimated NDV of the target column in the database system, fine-tuning the model for NDV estimation.

3. The method according to claim 2, wherein determining whether there is an anomaly in the estimated NDV of the target column in the database system comprises:
   querying a ground truth NDV of the target column in the database system when the database system is idle; and
   determining that there is an anomaly in the estimated NDV of the target column in the database system based on a comparison between the estimated NDV of the target column in the database system and the ground truth NDV of the target column in the database system.

4. The method according to claim 2, wherein the anomaly comprises the estimated NDV of the target column in the database system underestimating a ground truth NDV of the target column in the database system.

5. The method according to claim 2, wherein fine-tuning the model for NDV estimation comprises:
   updating a training dataset of the model for NDV estimation, wherein the updated training dataset comprises initial training data, sample data of a column related to the anomaly, and synthetic data with a high NDV feature; and
   further training the model for NDV estimation based on the updated training dataset.

6. The method according to claim 5, wherein further training the model for NDV estimation comprises:
   adjusting weights of the model for NDV estimation based on a reduced learning rate and an increased penalty weight for NDV underestimation.

7. The method according to claim 1, wherein the model for NDV estimation is trained offline and stored in the distributed file system.

8. The method according to claim 1, wherein reading and loading the model for NDV estimation into the kernel of the database system comprises:
   periodically and asynchronously loading the model for NDV estimation into the kernel of the database using a background process independent of the database system.

9. The method according to claim 1, wherein generating the feature data of the sample data of the target column in the database system comprises:
   generating a feature vector based on occurrence frequencies of different data elements in the sample data, wherein components of the feature vector represent the occurrence frequencies of different data elements in the sample data.

10. The method according to claim 1, further comprising:
    in response to a user or the kernel of the database system automatically triggering statistics collection for the database system, generating the feature data.

11. An electronic device, comprising:
    one or more processors; and
    a memory configured to store one or more programs that, when executed by the one or more processors, cause the one or more processors to implement a method comprising:
    reading and loading, from a distributed file system, a model for a number of distinct values (NDV) estimation into a kernel of the database system;
    generating feature data of sample data of a target column in the database system;
    determining, using the model for NDV estimation that has been loaded into the kernel of the database system, an estimated NDV for the target column in the database system based on the feature data; and
    storing the estimated NDV of the target column in the database system for use by the kernel of the database system.

12. The electronic device according to claim 11, wherein determining the estimated NDV for the target column in the database system comprises:
    determining whether there is an anomaly in the estimated NDV of the target column in the database system; and in response to determining that there is an anomaly in the estimated NDV of the target column in the database system, fine-tuning the model for NDV estimation.

13. The electronic device according to claim 12, wherein determining whether there is an anomaly in the estimated NDV of the target column in the database system comprises:
 querying a ground truth NDV of the target column in the database system when the database system is idle; and
 determining that there is an anomaly in the estimated NDV of the target column in the database system based on a comparison between the estimated NDV of the target column in the database system and the ground truth NDV of the target column in the database system.

14. The electronic device according to claim 12, wherein the anomaly comprises the estimated NDV of the target column in the database system underestimating a ground truth NDV of the target column in the database system.

15. The electronic device according to claim 12, wherein fine-tuning the model for NDV estimation comprises:
 updating a training dataset of the model for NDV estimation, wherein the updated training dataset comprises initial training data, sample data of a column related to the anomaly, and synthetic data with a high NDV feature; and
 further training the model for NDV estimation based on the updated training dataset.

16. The electronic device according to claim 15, wherein further training the model for NDV estimation comprises:
 adjusting weights of the model for NDV estimation based on a reduced learning rate and an increased penalty weight for NDV underestimation.

17. The electronic device according to claim 11, wherein the model for NDV estimation is trained offline and stored in the distributed file system.

18. The electronic device according to claim 11, wherein reading and loading the model for NDV estimation into the kernel of the database system comprises:
 periodically and asynchronously loading the model for NDV estimation into the kernel of the database system using a background process independent of the database system.

19. The electronic device according to claim 11, wherein generating the feature data of the sample data of the target column in the database system comprises:
 generating a feature vector based on occurrence frequencies of different data elements in the sample data, wherein components of the feature vector represent the occurrence frequencies of different data elements in the sample data.

20. A non-transitory computer-readable storage medium having a computer program stored thereon, wherein the computer program, when executed by a processor, causes a method comprising:
 reading and loading, from a distributed file system, a model for a number of distinct values (NDV) estimation into a kernel of the database system;
 generating feature data of sample data of a target column in the database system;
 determining, using the model for NDV estimation that has been loaded into the kernel of the database system, an estimated NDV for the target column based on the feature data; and
 storing the estimated NDV of the target column in the database system for use by the kernel of the database system.

* * * * *